June 19, 1956 L. P. KEVENEY 2,750,705
FISHHOOK EXTRACTING DEVICE
Filed June 28, 1954
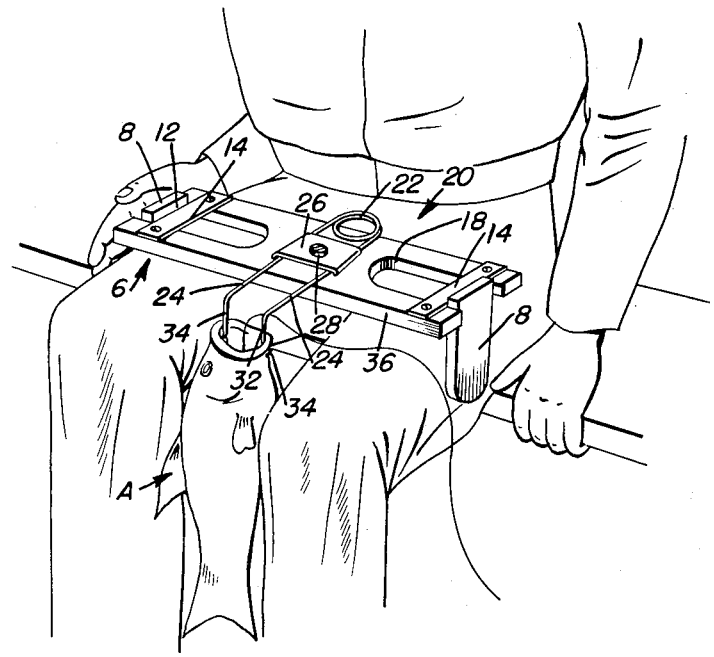
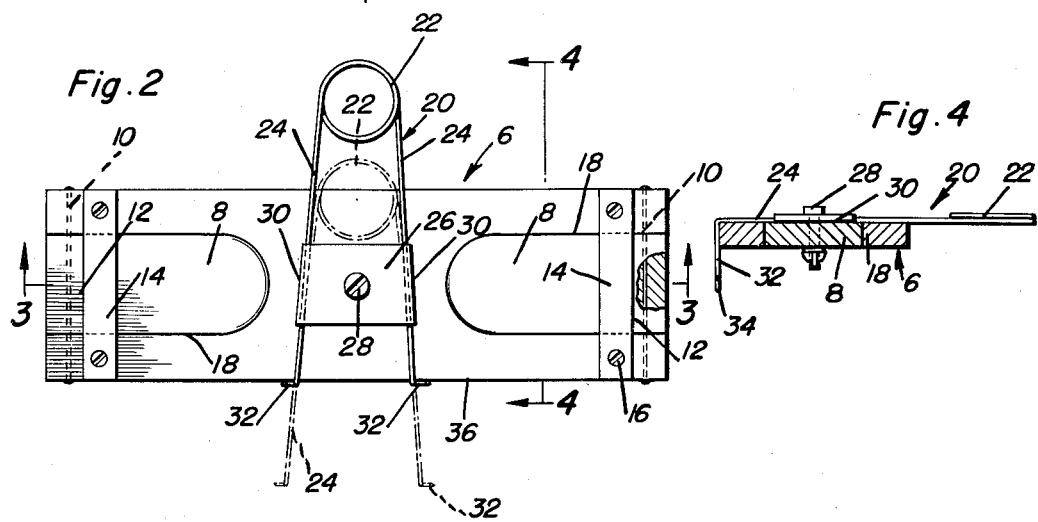
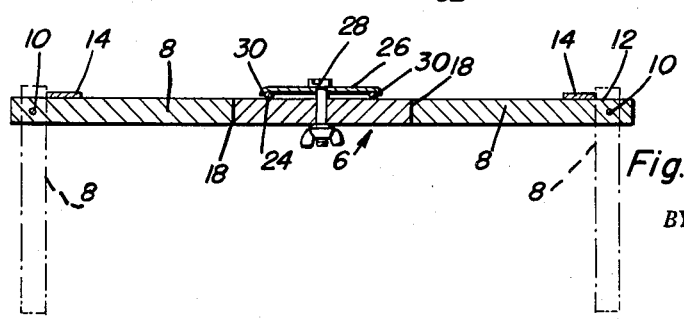
Leo P. Keveney
INVENTOR.
BY *Clarence A. O'Brien*
*and Harvey B. Jacobson*
Attorneys United States Patent Office 2,750,705
Patented June 19, 1956

2,750,705

FISHHOOK EXTRACTING DEVICE

Leo P. Keveney, Toledo, Ohio

Application June 28, 1954, Serial No. 439,570

2 Claims. (Cl. 43—53.5)

The present invention relates to a fish holding and fishhook extracting device and has reference, more specifically disclosed, to a simple, practicable and economical construction which serves to hold a fish in suspension with its mouth open so that the user, ordinarily a fisherman, may have access to and handily remove a fishhook from the then open mouth of the fish.

An object of the invention is to structurally, functionally, and otherwise improve upon similarly constructed and performing prior art devices, for example, to improve upon the fish mouth opener and holder of Hilbert C. Schwartz, Patent No. 1,433,041, of October 24, 1922. This patent shows a holder characterized by divergent spring actuated arms with free ends provided with mouth engaging hooks and with the converging ends of the arms bent and properly connected together with spring tensioning means, the arms being spread apart by the tension to embed the hooks or prongs in the mouth of the fish. The instant invention has to do with a broadly similar spring arm device which latter is readily and distinguishably different in that it is mounted on a lapboard and is so constructed that the fish to be operated on is handily and effectually suspended between the knees of the user with the mouth of the fish wide open and accessible so that the fisherman may have both hands to do the job with requisite convenience and certainty.

Briefly summarized, the invention therefore has to do with a so-called lapboard which is placed across the lap of the user and the combination therewith of a projectible and retractible approximately U-shaped spring mouth opener and holder, means being provided on said lapboard for securing the holder in the desired position thereon.

More specifically, novelty is predicated on a clamp on the lapboard which provides an operative connection between the lapboard and holder, which provides adjustment for the arms of the holder so that they may be sprung closer to or farther from each other, the lapboard being further unique in that it has projectible and retractible members which assist in maintaining the lapboard handily in place.

Other objects, features and advantages will become more readily apparent from the following description and the accompanying sheet of illustrative drawings.

In the drawings, wherein like numerals are employed to designate like parts throughout the views:

Figure 1 is a perspective view of a fishhook extracting device constructed in accordance with the principles of the invention and showing the manner in which the same is constructed and used;

Figure 2 is a top plan view of the same with the projectible and retractible or folding retainers in their folded out-of-the-way positions;

Figure 3 is a section on the longitudinal line 3—3 of Figure 2, looking in the direction of the arrows; and Figure 4 is a cross-section on the line 4—4 of Figure 2, looking in the direction of the arrows.

Referring now to the drawings with the aid of reference numerals and lead lines, a rectangular wooden or equivalent lapboard is denoted generally by the numeral 6. It is of a desired size, of course, to rest upon the lap or legs of the user in the manner illustrated in Fig. 1. To assist in retaining the board in place, it is provided with folding or projectible and retractible retainers. These retainers are denoted by the numerals 8—8 and they are actually cut out from the ends of the board providing a notch into which they are foldable to retracted positions when they are not in use, this as shown in Figures 2 to 4, inclusive. More specifically, each retainer has its outer end hingedly mounted on an appropriately anchored rod which is denoted by the numeral 10 in Fig. 2. The retainer is pivoted or hinged in such a way that the upper end swings against a stop shoulder 12 which is provided by a crosspiece 14 fastened in place at 16 and spanning one end portion of the receiving notch, that is, the notch 18. Thus, by simply sawing, or otherwise cutting the notches in the ends of the board and then using the cut-outs as retainers, the latter may be handily hinged and folded to out-of-the-way positions when they are not in use. They come in mighty handy when the device is placed on the lap, as illustrated in Fig. 1. That is to say, the lapboard is thus nicely maintained in a handy and desirably usable position. The primary purpose of this is, however, to accommodate the adjustable, slidably mounted fish mouth opener and holder, that is, the device 20. This is constructed from a length of wire which is bent upon itself between its ends to form a spring coil 22 and a pair of expansible and contractible spring arms or fingers 24—24. These normally spread outwardly but they are prevented from over-expanding by way of a simple clamping plate 26, secured by means of a screw, bolt, or the like, 28 on the top of the intermediate portion of the lapboard 6 and has downturned flanges 30—30 on the transverse ends which sort of hook the intermediate portions of the limbs in place. The flanges 30 are in convergent relationship and by pushing the device 20 from the full line to the dotted line position, the arms spring apart to their widest degree or extent. The free end portions of the arms are laterally bent, that is, downwardly bent as at 32 and they have lateral extremities 34 which define hooks. The hooks embed themselves in the mouth of the fish A in the obvious manner shown in Fig. 1. Thus, we have a clamping plate on the intermediate top of the board and a detachable and slidable generally V-shaped or U-shaped spring member 20 with a coil spring pressing the limbs apart and with the flanges on the clamping plate keeping the limbs from spreading too far apart. When the device 20 is not in use, the depending end portions 32 are drawn in against the forward edge portion 36 of the board which facilitates adjusting the device, also carrying it handily in a fishing tackle box or elsewhere with a minimum of inconvenience and difficulty.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A device of the class described comprising a flat lapboard adapted to be placed upon the lap of the user, a clamping plate, a fastener removably securing said plate to a top central portion of said board, said plate being provided at opposite end portions with flanges bent laterally toward said board, a spreader tool comprising a substantially U-shaped spring member embodying a coil spring and a pair of spreadable spring arms connected therewith, said arms resting atop said board with the intermediate portions of the arms slidably engaging the flanges and situated between the plate and the board for adjustment of the spread thereof, said arms being adapted to spreadably suspend an article in a readily manipulatable position from said lapboard.

2. The structure defined in claim 1 and wherein said arms are of a length appreciably greater than the width of said board, said coil spring being normally positioned to project beyond a longitudinal edge portion of the board, the ends of the arms opposite to the coil spring connected ends being formed with depending bent portions having terminal hooks, said bent portions being adapted to abut the adjacent longitudinal edge of the board in one adjusted position of said arms whenever necessary or desired.

References Cited in the file of this patent

UNITED STATES PATENTS

| | | |
|---|---|---|
| 102,530 | Gammel | May 3, 1870 |
| 221,251 | Pomroy | Nov. 4, 1879 |
| 288,287 | Whipple | Nov. 13, 1883 |
| 939,508 | Hull | Nov. 9, 1909 |
| 1,175,982 | Parent | Mar. 21, 1916 |
| 1,208,671 | Severtsen et al. | Dec. 12, 1916 |
| 1,317,550 | Cass | Sept. 30, 1919 |
| 1,433,041 | Schwartz | Oct. 24, 1922 |
| 1,546,116 | Bradt | July 14, 1925 |
| 2,472,962 | Shuflin | June 14, 1949 |

FOREIGN PATENTS

| | | |
|---|---|---|
| 13,912 | Great Britain | 1898 |